United States Patent [19]

Cattaneo et al.

[11] 3,947,073
[45] Mar. 30, 1976

[54] DEVICE FOR REDUCING THE BRAKING EFFECT OF THE ENGINE OF A MOTOR VEHICLE EQUIPPED WITH AN ANTI-SKID BRAKING SYSTEM

[75] Inventors: Maurizio Cattaneo, Turin; Armando Marchino, Cambiano (Turin); Luigi Doano, Revigliasco d'Asti (Asti), all of Italy

[73] Assignee: Fiat Societa per Azioni, Turin, Italy

[22] Filed: June 19, 1974

[21] Appl. No.: 480,800

[30] Foreign Application Priority Data
July 23, 1973  Italy .................................. 69197/73

[52] U.S. Cl. ......... 303/21 R; 123/198 D; 180/82 R; 188/273; 192/3 R
[51] Int. Cl.² ............................................ B60T 8/04
[58] Field of Search .. 180/103, 105 R, 82 R, 105 E, 180/77 R; 192/3 R; 303/21 R, 21 F, 21 CF, 21 CG, 21 EB; 188/273, 279; 123/198 D, 106, 97 B, 102, 198 R

[56] References Cited
UNITED STATES PATENTS

| | | | |
|---|---|---|---|
| 2,486,369 | 10/1949 | Goss | 180/105 R X |
| 2,935,167 | 5/1960 | Stelzer | 192/3 R |
| 3,330,113 | 7/1967 | Perrino | 180/103 X |
| 3,485,316 | 12/1969 | Slavin et al. | 180/105 R |
| 3,622,973 | 11/1971 | Domann et al. | 303/21 EB |
| 3,647,016 | 3/1972 | Fitzsimons et al. | 180/105 R |
| 3,705,639 | 12/1972 | Colling et al. | 180/105 E |
| 3,722,492 | 3/1973 | Shibata | 180/82 R X |
| 3,752,249 | 8/1973 | Gelenius | 180/105 E X |
| 3,763,975 | 6/1972 | Fontaine | 180/103 UX |
| 3,776,355 | 12/1973 | Scherenberg | 180/82 R X |
| 3,802,528 | 4/1974 | Leiber | 303/21 EB X |

*Primary Examiner*—Trygve M. Blix
*Assistant Examiner*—Douglas C. Butler
*Attorney, Agent, or Firm*—Sughrue, Rothwell, Mion, Zinn & Macpeak

[57] ABSTRACT

An anti-skid braking system which includes a throttle control arrangement associated with the throttle plate located in the induction manifold for opening the plate upon operation of the anti-skid system in order to compensate for the braking effect of the engine initiated upon release of the accelerator pedal. The throttle arrangement includes a solenoid-controlled vacuum actuator and a piston connected to the throttle plate through a lever system.

4 Claims, 1 Drawing Figure

U.S. Patent   March 30, 1976   3,947,073
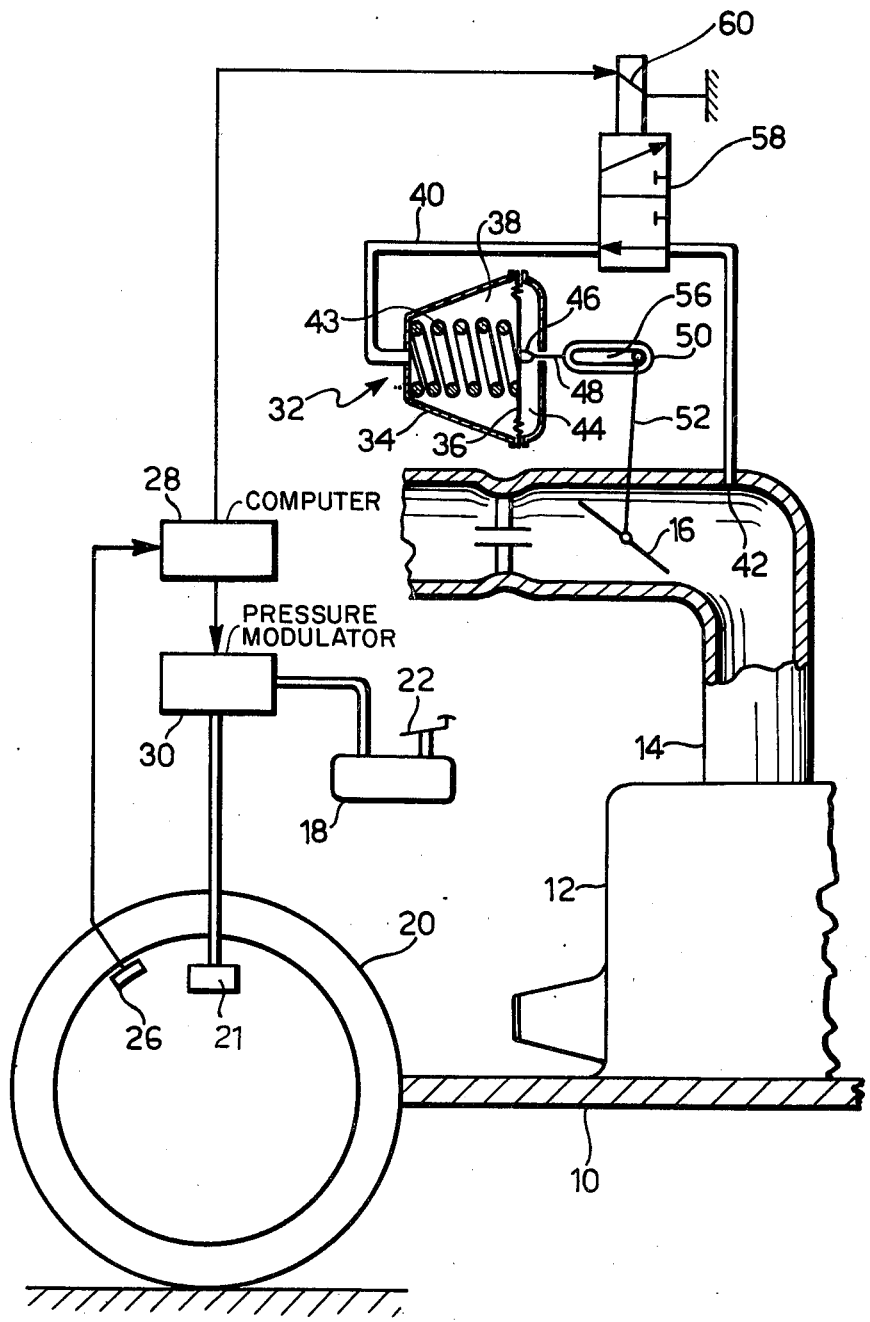

DEVICE FOR REDUCING THE BRAKING EFFECT OF THE ENGINE OF A MOTOR VEHICLE EQUIPPED WITH AN ANTI-SKID BRAKING SYSTEM

BACKGROUND OF THE INVENTION

This invention relates to a device for reducing the braking effect of the engine of a motor vehicle equipped with an anti-skid braking system.

It is known, that in a vehicle equipped with an internal combustion engine, the moment the accelerator pedal is released the engine itself commences a braking action; this engine braking action is proportionately greater the greater the speed of the vehicle. While the braking effect of the engine is largely exploited when travelling downhill or during normal braking, without skidding, it is particularly dangerous when the vehicle is equipped with an anti-skid braking system, because it augments the already controlled action of the braking system. Furthermore the braking effect of the engine is particularly marked at the beginning of the braking process, when the anti-skid braking system can be slow to intervene for various reasons.

A principal object, therefore, of the present invention is the provision of a vehicle equipped with a control device capable of reducing or eliminating the braking effect of the engine during braking of a vehicle upon intervention of an anti-skid braking system.

A further object of the invention is the provision of a device as aforesaid which can be conveniently used at all speeds of the vehicle.

SUMMARY OF THE INVENTION

According to the invention there is provided a vehicle equipped with an internal combustion engine having at least one induction manifold and a throttle valve for regulating the air flow therein, including an anti-skid braking system for the wheels of the vehicle, wherein control means are provided for controlling the throttle valve under control of the anti-skid braking system so as to cause the opening of the throttle valve when the anti-skid braking system commences operation.

BRIEF DESCRIPTION OF THE DRAWING

The invention will be more clearly understood from the description which follows, given by way of non-limiting example, with reference to the single appended drawing, which is a schematic representation of part of a vehicle equipped with an anti-skid braking system and a control device according to the invention.

DETAILED DESCRIPTION OF THE ILLUSTRATED EMBODIMENT

Reference numeral 10 indicates generally part of the chassis of a motor vehicle, on which an internal combustion engine 12 is mounted. The engine 12 has an induction manifold 14 and a throttle valve 16. In the figure there is also indicated diagrammatically a braking system 18 for a wheel 20 of the vehicle, of any type, having a brake actuator 21 operable by a brake pedal 22, and an anti-skid braking control system which comprises in general a tachometer 26 for detecting the angular velocity of the wheel 20 and a central electronic computer 28 which controls pressure modulator means 30 so as to relieve the pressure of the hydraulic brake fluid in the brake actuator 21 in the event of incipient skidding of the wheel.

A vacuum actuator 32 comprises a housing 34 containing an internal diaphragm 36 which delimits within the housing a first chamber 38, connected through a conduit 40 to a point 42 of the induction manifold 14, downstream of the throttle valve 16. A compression spring 43 is located in the chamber 38 and acts on the diaphragm 36, which also delimits within the housing 34 a second chamber 44 freely vented to the atmosphere. A small piston 46 is housed in the second chamber 44 and is joined to the diaphragm 36. The piston 46 has an extension 48 kinematically connected to the throttle valve 16 through a lever system 52; the lever system 52 can easily be dimensioned so as to cause only rotation of the throttle valve 16, independently of the control connection of the accelerator pedal of which only the control rod 50 is shown. When the driver operates the accelerator pedal the actuator 32 is unaffected since the end of the lever system 52 connected to the throttle valve 16 runs in a groove 56 provided in the rod 50.

Any other type of mechanism may be provided to make the movements of the throttle valve 16 due to the accelerator pedal and those due to the actuator 32 independent of each other.

In the conduit 40 a valve unit is inserted, which in the illustrated embodiment is constituted by a three-way, two-position solenoid valve 58, arranged so as normally to interrupt the communication between the chamber 38 and the induction manifold 14. The excitation winding 60 of the solenoid valve 58 is energized by a control signal provided by the central electronic computer 28; in the drawing the valve 58 is represented in its energized position.

The operation of the control device according to the invention is as follows:

When the accelerator is released and the brakes applied, a braking action of the engine 12 commences which, because of the closure of the throttle valve 16, results in a vacuum in the induction manifold 14 and therefore at the point 42. If the wheel 20 is in a condition of incipient skidding the electronic computer 28 of the anti-skid braking control system emits a signal which controls the modulating means 30 so as to decrease the pressure applied to the brake actuator 21 of the wheel 20. At the same time the winding 60 of the solenoid valve 58 is energized, thereby opening the valve 58 and establishing communication between the chamber 38 and the induction manifold 14. In this way a vacuum is caused in the chamber 38 and the diaphragm 36 is displaced (to the left as viewed in the drawing), overcoming the force of the spring 42, and carrying with it the small piston 46. The piston 46, acting through the mechanism 50, 52, causes the throttle valve 16 to rotate in an opening direction, thereby reducing the braking action of the engine. It is clear that the opening of the throttle valve is a function of the induction manifold vacuum, that is of the overall braking effect of the engine, and therefore in the end it will depend upon the speed of the vehicle.

The time for which the valve 58 is opened, and more generally, the time of operation of the device which puts the vacuum actuator 32 into communication with the induction manifold 14, depends on the requirements of the vehicle braking characteristics: the valve 58 can in fact be opened throughout the time of functioning of the anti-skid system, or it can be regulated by a timing device, incorporated in the computer 28, so that after a certain time from the first anti-skid braking control cycle the communication through the conduit 40, and therefore the operation of the device, is interrupted by closure of the valve 58. The time of opening of the valve 58 can also be varied in dependence upon other influencing parameters, for example upon a signal directly provided by a decelerometer included in the computer 28, or alternatively this time can be dependent upon other quantities, and can have a fixed duration.

Naturally, while keeping to the principle of this invention, practical embodiments and the dimensioning of details can be widely varied without departing from the spirit or scope of this invention.

We claim:

1. In a vehicle equipped with an internal combustion engine having at least one induction manifold connected thereto to direct fuel/air mixture into the cylinders of the engine, a throttle valve located within said manifold for regulating the air flow therein, and an anti-skid braking system connected to the wheels of the vehicle, the improvement which comprises throttle control means connected to and controlled by the anti-skid braking system, said throttle control means including an actuator connected to the throttle valve, and also connected to the induction manifold said throttle control means being effective to cause the opening of the throttle valve when the anti-skid braking system commences operation, and wherein the position of the throttle valve is varied, through the actuator, by the induction manifold vacuum.

2. The vehicle defined in claim 1, including a mechanical linkage connecting said actuator to the throttle valve.

3. The vehicle defined in claim 1, wherein said actuator comprises a housing, a diaphragm delimiting within the housing a first and a second chamber, a conduit connecting said first chamber to the engine induction manifold, a freely displaceable piston connected to said diaphragm in said second chamber, a compression spring disposed within the first chamber and acting on the diaphragm, said piston having an extension which projects outside the housing, means connecting said extension to the throttle valve, valve means disposed in said conduit, said valve means being operable selectively to allow and to interrupt communication between the first chamber and the induction manifold, and valve operating means connected to said anti-skid braking system and controlled by the latter.

4. The vehicle defined in claim 3, wherein said valve operating means comprise a solenoid connected electrically to the anti-skid braking system, the valve being normally closed and being opened by the solenoid upon operation of the anti-skid braking system.

* * * * *